United States Patent
Mizuguchi et al.

(10) Patent No.: US 9,282,485 B2
(45) Date of Patent: Mar. 8, 2016

(54) TERMINAL APPARATUS FOR TRANSFERRING SIGNAL CONTAINING PREDETERMINED INFORMATION AND COMMUNICATION SYSTEM

(71) Applicant: PANASONIC CORPORATION, Osaka (JP)

(72) Inventors: Takao Mizuguchi, Gifu (JP); Miwa Yoneda, Gifu (JP); Hiroshi Takemura, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 14/102,435

(22) Filed: Dec. 10, 2013

(65) Prior Publication Data

US 2014/0098664 A1 Apr. 10, 2014

Related U.S. Application Data

(63) Continuation of application No. PCT/JP2012/004432, filed on Jul. 9, 2012.

(30) Foreign Application Priority Data

Jul. 8, 2011 (JP) ................................ 2011-152269

(51) Int. Cl.
*H04L 12/26* (2006.01)
*H04W 28/02* (2009.01)
(Continued)

(52) U.S. Cl.
CPC ..... *H04W 28/0289* (2013.01); *G08G 1/096716* (2013.01); *G08G 1/096741* (2013.01); *G08G 1/096775* (2013.01); *H04W 4/021* (2013.01); *H04W 76/002* (2013.01); *H04W 4/046* (2013.01)

(58) Field of Classification Search
None
See application file for complete search history.

(56) References Cited

U.S. PATENT DOCUMENTS 6,097,313 A 8/2000 Takahashi et al.
6,335,693 B1 1/2002 Takahashi et al.
(Continued)

FOREIGN PATENT DOCUMENTS

JP 11-167695 6/1999
JP 2005-202913 A 7/2005
(Continued)

OTHER PUBLICATIONS

Search Report issued in International Application No. PCT/JP2012/004432 dated Sep. 18, 2013.

*Primary Examiner* — Michael J Moore, Jr.
(74) *Attorney, Agent, or Firm* — McDermott Will & Emery LLP

(57) ABSTRACT

A first communication unit receives packet signals broadcast from a base station apparatus and also receives packet signals broadcast from other terminal apparatuses according to a first communication scheme. A second communication unit communicates with a mobile apparatus according to a second communication scheme that differs from the first communication scheme. A receiving unit receives a filtering condition from the mobile apparatus by way of the second communication unit. A filtering unit selects a packet signal, which matches the filtering condition, from among the packet signals received by the first communication unit. A transfer unit transfers information, contained in the selected packet signal selected, from the second communication unit to the mobile apparatus.

3 Claims, 11 Drawing Sheets

(51) Int. Cl.
*G08G 1/0967* (2006.01)
*H04W 76/00* (2009.01)
*H04W 4/02* (2009.01)
*H04W 4/04* (2009.01)

(56) References Cited

U.S. PATENT DOCUMENTS

| | | | | |
|---|---|---|---|---|
| 8,520,695 | B1* | 8/2013 | Rubin | G08G 9/02 |
| | | | | 370/337 |
| 8,738,280 | B2* | 5/2014 | Haran | 701/300 |
| 9,036,509 | B1* | 5/2015 | Addepalli et al. | 370/259 |
| 2008/0303696 | A1* | 12/2008 | Aso | G08G 1/161 |
| | | | | 340/935 |
| 2008/0316052 | A1* | 12/2008 | Ruffini | 340/901 |
| 2010/0010742 | A1* | 1/2010 | Mochizuki | 701/301 |
| 2011/0090339 | A1* | 4/2011 | Higgins-Luthman | B60R 1/00 |
| | | | | 348/148 |
| 2011/0196568 | A1* | 8/2011 | Nickolaou et al. | 701/29 |
| 2011/0205943 | A1* | 8/2011 | Grimm et al. | 370/310 |
| 2012/0249343 | A1* | 10/2012 | Thomas | 340/905 |
| 2012/0306664 | A1* | 12/2012 | Geter | G08G 1/166 |
| | | | | 340/903 |
| 2015/0042491 | A1* | 2/2015 | Burnison | B60Q 1/52 |
| | | | | 340/902 |

FOREIGN PATENT DOCUMENTS

| | | |
|---|---|---|
| JP | 2009-104230 A | 5/2009 |
| JP | 2009-206866 A | 9/2009 |
| WO | 2011/052681 A1 | 5/2011 |

\* cited by examiner

FIG.3A

| 1ST SUBFRAME | 2ND SUBFRAME | 3RD SUBFRAME | ~ | NTH SUBFRAME |

FIG.3B

| ROAD-TO-VEHICLE TRANSMISSION PERIOD | INTER-VEHICULAR TRANSMISSION PERIOD | INTER-VEHICULAR TRANSMISSION PERIOD | ~ | INTER-VEHICULAR TRANSMISSION PERIOD |

FIG.3C

| INTER-VEHICULAR TRANSMISSION PERIOD | ROAD-TO-VEHICLE TRANSMISSION PERIOD | INTER-VEHICULAR TRANSMISSION PERIOD | INTER-VEHICULAR TRANSMISSION PERIOD | ~ | INTER-VEHICULAR TRANSMISSION PERIOD |

FIG.3D

| INTER-VEHICULAR TRANSMISSION PERIOD | INTER-VEHICULAR TRANSMISSION PERIOD | ROAD-TO-VEHICLE TRANSMISSION PERIOD | INTER-VEHICULAR TRANSMISSION PERIOD | ~ | INTER-VEHICULAR TRANSMISSION PERIOD |

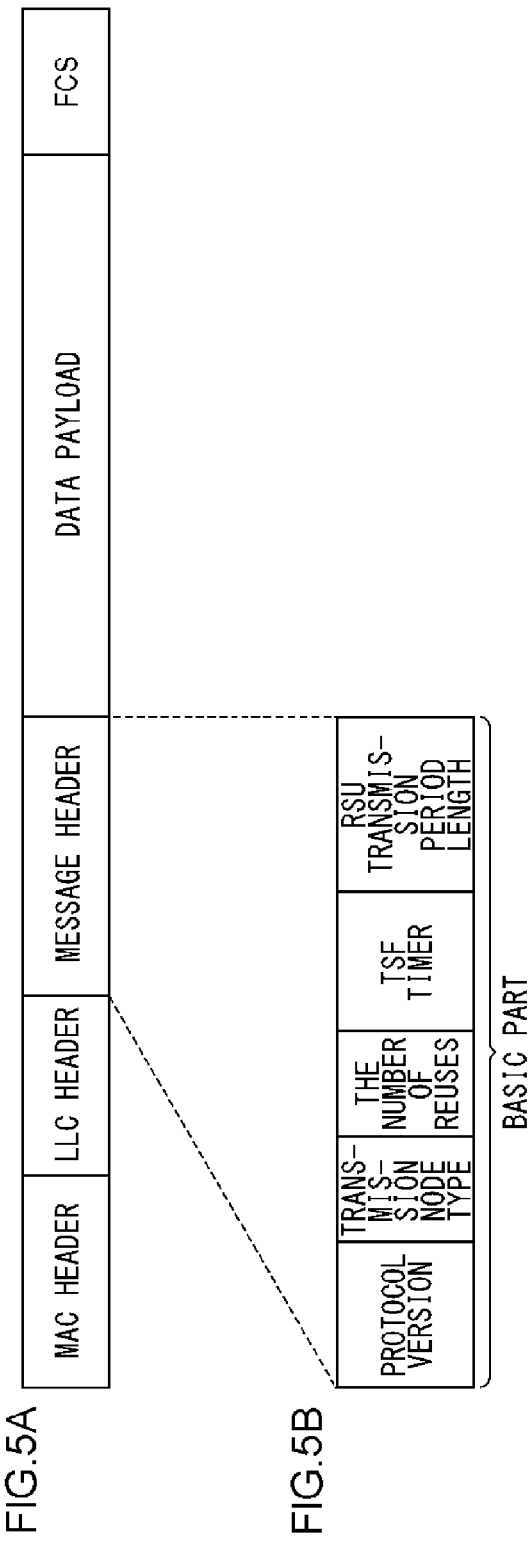

FIG.9

| NAME OF APPLICATION PROGRAM 220 | STARTUP TIMING 222 | FILTERING CONDITION 224 | SENDER OF PACKET SIGNALS BROADCAST 226 |
|---|---|---|---|
| RIGHT-TURN DIRECT COLLISION PREVENTION SUPPORT | APPROACH TO THE INTERSECTION + RIGHT-TURN | BASE STATION APPARATUS ID | BASE STATION APPARATUS |
| RIGHT/LEFT-TURN PEDESTRIAN COLLISION PREVENTION SUPPORT | APPROACH TO THE INTERSECTION + RIGHT-TURN OR LEFT-TURN | | |
| START DELAY PREVENTION SUPPORT | APPROACH TO THE INTERSECTION + STOP | BASE STATION APPARATUS ID | |
| TURN-OFF-ENGINE-WHEN-STOPPED SUPPORT | | | |
| GREEN WAVE RUNNING SUPPORT | ENTRY | TRANSFER INTERVAL | IN-VEHICLE TERMINAL APPARATUS |
| COLLISION (REAR-END COLLISION) PREVENTION SUPPORT | ENTRY | AREA INFORMATION | |
| CLP CONGESTION PREDICTION | | | |
| COMMUNICATIONS | ENTRY | AREA INFORMATION OR IN-VEHICLE TERMINAL APPARATUS ID | |
| ACCIDENT-AT-START-TIMING PREVENTION SUPPORT | ENTRY | THRESHOLD VALUE | MOBILE TERMINAL APPARATUS |
| DISPLAYING OF A PEDESTRIAN CARRYING ONE OF A MATCHED PAIR OF TERMINAL APPARATUSES | ENTRY | MOBILE TERMINAL APPARATUS ID | |

144

TERMINAL APPARATUS FOR TRANSFERRING SIGNAL CONTAINING PREDETERMINED INFORMATION AND COMMUNICATION SYSTEM

RELATED APPLICATIONS

This application is a Continuation of International Application No. PCT/JP2012/004432, filed on Jul. 9, 2012, which in turn claims the benefit of Japanese Application No. 2011-152269, filed on Jul. 8, 2011, the disclosures of which Applications are incorporated by reference herein.

BACKGROUND

Field of the Disclosure

The present disclosure relates to a communication technology, and it particularly relates to a terminal apparatus for transferring signal containing predetermined information and a communication system.

Road-to-vehicle communication has been under investigation in an effort to prevent collision accidents of vehicles on a sudden encounter at an intersection. Such a road-to-vehicle communication necessitates installation of roadside units, which means a great cost of time and money. In contrast to this, a vehicle-to-vehicle (inter-vehicular) communication, in which information is communicated between in-vehicle units, has no need for installation of roadside units. In that case, current position information is detected in real time by GPS (Global Positioning System) or the like and the thus detected position information is exchanged between the in-vehicle units. Thus it is determined on which of the roads leading to the intersection a driver's vehicle and the other vehicles are located.

SUMMARY

In order to have a mobile apparatus process the services of ITS (Intelligent Transport Systems), a terminal apparatus needs to transfer the received packet signals to the mobile apparatus. If the terminal apparatus transfers all packet signals, the communication traffic volumes between the terminal apparatus and the mobile apparatus may possibly be too large to be handled.

The present disclosure has been made in view of the foregoing circumstances, and a purpose thereof is to provide a technology for suppressing the increase in traffic volumes when information is transferred by ITS.

In order to resolve the above-described problems, a terminal apparatus according to one example of the present disclosure includes: a first communication unit configured to receive packet signals broadcast from a base station apparatus and configured to receive packet signals broadcast from another terminal apparatus according to a first communication scheme; a second communication unit configured to communicate with a mobile apparatus according to a second communication scheme that differs from the first communication scheme; and a control unit configured to control communication processing carried out by the second communication unit. The control unit includes: a receiving unit configured to receive a filtering condition from the mobile apparatus by way of the second communication unit; a filtering unit configured to select a packet signal, which matches the filtering condition received by the receiving unit, from the packet signals received by the first communication unit; and a transfer unit configured to transfer information, contained in the packet signal selected by the filtering unit, from among the second communication unit to the mobile apparatus.

Optional combinations of the aforementioned constituting elements, and implementations of the disclosure in the form of methods, apparatuses, systems, recording media, computer programs and so forth may also be practiced as additional modes of the present disclosure.

BRIEF DESCRIPTION OF THE DRAWINGS

Examples will now be described by way of examples only, with reference to the accompanying drawings which are meant to be exemplary, not limiting and wherein like elements are numbered alike in several Figures in which:

FIGS. 3A to 3D each shows a format of frame specified in the communication system of FIG. 1;

FIGS. 5A and 5B each shows a format of MAC frame stored in a packet signal defined in the communication system of FIG. 1;

FIG. 9 is a diagram showing a data structure of a table in a condition setting unit shown in FIG. 8;

DETAILED DESCRIPTION

Figure 1:
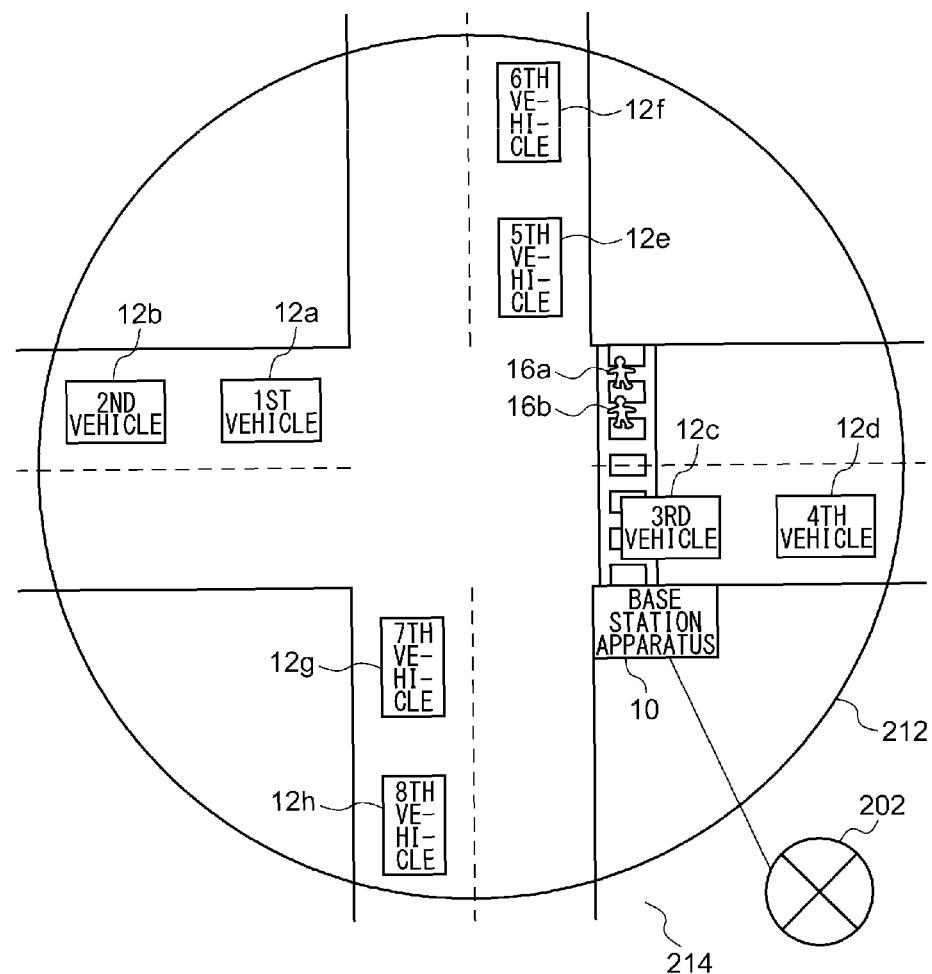
FIG. 1 shows a structure of a communication system according to an example of the present disclosure.

The disclosure will now be described by reference to the preferred examples. This does not intend to limit the scope of the present disclosure, but to exemplify the disclosure.

Our knowledge underlying the present disclosure will be explained before examples of the present disclosure are explained in detail. An access control function called CSMA/CA (Carrier Sense Multiple Access with Collision Avoidance) is used in wireless LANs (Local Area Network) compliant with standards such as IEEE 802.11. In such a wireless LAN, therefore, the same wireless channel is shared by a plurality of terminal apparatuses. In such a scheme as CSMA/MA, a packet signal is transmitted after it has been verified by carrier sense that other packet signals are not being transmitted. When wireless LAN is applied to the inter-vehicular communication such as ITS, a need arises to transmit information to a large indefinite number of terminal apparatuses, and therefore it is suitable that signals be transmitted by broadcast. As a result, a terminal apparatus detects the approach of another vehicle by receiving the signals sent by broadcast. The terminal apparatus conveys this information to a driver, thereby alerting the driver for the purpose of preventing collision accidents between vehicles.

It is desired that not only the collision accidents of vehicles but also the collision accidents between a pedestrian or the like and a vehicle be prevented. To cope with this, not only a terminal apparatus is mounted on the vehicle but also a terminal apparatus is carried by the pedestrian. Hereinafter, a terminal apparatus mounted on the vehicle will be referred to as "in-vehicle terminal apparatus" also. Since the terminal apparatus carried by the pedestrian is battery-driven, the processing amount in the battery-driven terminal apparatus carried by the pedestrian needs to be reduced as compared to the processing amount in the in-vehicle terminal apparatus. For example, the approach of the other vehicles is not conveyed to the pedestrian, and the pedestrian's terminal apparatus is not equipped with the GPS (Global Positioning System) function by which to determine his/her own position. The in-vehicle terminal apparatus determines that a pedestrian is walking nearby if a packet signal is received from the terminal apparatus carried by the pedestrian and if the received power is large.

Under such circumstances, there are cases where persons, who get on the vehicle, such as the driver and passengers, carry mobile apparatuses such as cellular phone units. The mobile apparatus may be a multifunctional apparatus, such as a smart phone, for instance. Since new application programs are more easily installed in a mobile apparatus than a terminal apparatus, a new service can be adopted more easily by the mobile apparatus. In order to have the mobile apparatus process a service of ITS, the terminal apparatus needs to transfer the received packet signals to the mobile apparatus. If the terminal apparatus transfers all packet signals, the communication traffic volumes between the terminal apparatus and the mobile apparatus may possibly be too large to be handled.

The present example relates to an ITS communication system. In this ITS communication system, not only the inter-vehicular communication is carried out between terminal apparatuses mounted on vehicles (hereinafter a terminal apparatus mounted on a vehicle will be referred as a "terminal apparatus for use in a vehicle" or "in-vehicle terminal apparatus") and but also the road-to-vehicle communication is carried out from a base station apparatus installed at an intersection or the like to an in-vehicle terminal apparatus. As the inter-vehicular communication, the in-vehicle terminal apparatus transmits, by broadcast, a packet signal in which the information such as the traveling speed and position of a vehicle is stored (hereinafter such information will be hereinafter referred to as "data" also). Also, the other in-vehicle terminal apparatuses receive the packet signals and recognize the approach or the like of vehicle(s) based on the data. Notifying the driver of the approach of vehicle(s) alerts the driver. To reduce the interference between the inter-vehicular communication and the road-to-vehicle communication, the base station apparatus repeatedly specifies a frame that contains a plurality of subframes. To perform the road-to-vehicle communication, the base station apparatus selects any of the plurality of subframes and transmits, by broadcast, a packet signal that contains control information and the like, in a period of a beginning part of the selected subframe. The control information contains information regarding a time length needed for the transmission of the packet signal by broadcast from the base station apparatus (hereinafter this time length will be referred to as "road-to-vehicle transmission period").

The terminal apparatus identifies the road-to-vehicle period based on the control information, and transmits the packet signal in a period other than the road-to-vehicle transmission period. Since in this manner the road-to-vehicle communication and the inter-vehicular communication are subjected to time-division multiplexing, the collision probability of packet signals in between the road-to-vehicle communication and the inter-vehicular communication is reduced. Note that the inter-vehicular communication is carried out in a period for the execution of inter-vehicular communication (hereinafter referred to as "inter-vehicular transmission period") other than the road-to-vehicle transmission period, by use of the CSMA scheme. Such a terminal apparatus is carried by the pedestrian as well. Hereinafter, a terminal apparatus carried by a pedestrian will be referred to as "mobile terminal apparatus"). The mobile terminal apparatus is battery-powered and entails a low power consumption. Thus the mobile terminal apparatus only transmits, by broadcast, the packet signals that store the data and does not notify the pedestrian of the approach of vehicle(s). Note that, in the following description, even when the mobile terminal apparatus is used, the communication performed then may be expressed as "inter-vehicular communication" or "road-to-vehicle communication". Also, there may be cases where the in-vehicle terminal apparatus and the mobile terminal apparatus are called "terminal apparatus" with no distinction made therebetween, and there may also be cases where the in-vehicle terminal apparatus and the mobile terminal apparatus will be generically referred to as "terminal apparatus".

The in-vehicle terminal apparatus has not only a wireless communication function compatible with the aforementioned ITS but also a wireless communication function compatible with a short-range radio communication scheme. The in-vehicle terminal apparatus having these functions communicates with the mobile apparatus using the short-range radio communication scheme. The in-vehicle terminal apparatus transfers information, contained in the packet signals received in the road-to-vehicle communication and/or inter-vehicular communication, to the mobile apparatus using the short-range radio communication scheme. The mobile apparatus is carried by a person in the vehicle, and the mobile apparatus executes application programs using the information sent from the in-vehicle terminal apparatus. An example of the application programs is a program for a right-turn direct collision prevention support or the like. The transmission rate in the short-range radio communication scheme is generally lower than that of a wireless communication scheme compatible with ITS. Accordingly, the increase in traffic volumes in a transfer needs to be suppressed. In order to meet this demand, the communication system according to the present example carries out the following processing.

The mobile apparatus generates a filtering condition according to an application program being executed. The mobile apparatus transmits the filtering condition to the in-vehicle terminal apparatus using the short-range radio communication scheme. The in-vehicle terminal apparatus sets the filtering condition. The in-vehicle terminal apparatus selects a received ITS packet signal according to the filtering condition and then transfers the information contained in the selected packet signal. It is to be noted here that, for example, a correspondence between application programs and filtering conditions may be determined beforehand in the terminal apparatuses.

FIG. 1 shows a structure of a communication system 100 according to an example of the present disclosure. FIG. 1 corresponds to a case where an intersection is viewed from above. The communication system 100 includes a base station apparatus 10 and a first vehicle 12*a*, a second vehicle 12*b*, a third vehicle 12*c*, a fourth vehicle 12*d*, a fifth vehicle 12*e*, a sixth vehicle 12*f*, a seventh vehicle 12*g*, and an eighth vehicle 12*h*, which are generically referred to as "vehicle 12" or "vehicles 12", a first pedestrian 16*a* and a second pedestrian 16*b*, who are generically referred to as "pedestrian" or "pedestrians". A not-shown in-vehicle terminal apparatus is mounted on each vehicle 12, and each pedestrian 16 carries a not-shown mobile terminal apparatus. Further, at least one person, who gets on a vehicle, carries a not-shown mobile apparatus. Here, the person may be a driver and/or passenger(s). An area 212 is formed around the base station apparatus 10, and an almost-unreachable area 214 is formed outside the area 212.

As shown in FIG. 1, a road extending in the horizontal, or left-right, direction and a road extending in the vertical, or up-down, direction in FIG. 1 intersect with each other in the central portion thereof. Note here that the upper side of FIG. 1 corresponds to the north, the left side thereof the west, the down side thereof the south, and the right side thereof the east. And the portion where the two roads intersect each other is the "intersection". The first vehicle 12a and the second vehicle 12b are advancing from left to right, while the third vehicle 12c and the fourth vehicle 12d are advancing from right to left. Also, the fifth vehicle 12e and the sixth vehicle 12f are advancing downward, while the seventh vehicle 12g and the eighth vehicle 12h are advancing upward.

The base station apparatus 10 controls communications between the terminal apparatuses. The base station apparatus 10 repeatedly generates a frame containing a plurality of subframes, based on the signal received from not-shown GPS satellites and frames formed by the other base station apparatuses 10 (not-shown). Here, a definition is made such that the road-to-vehicle transmission period can be set to the leading part (beginning part) of each subframe. The base station apparatus 10 selects a subframe, in which the road-to-vehicle transmission period is not set by the other base station apparatuses 10, from among a plurality of subframes. The base station apparatus 10 sets the road-to-vehicle transmission period to the beginning part of the selected subframe. The base station apparatus 10 broadcasts the packet signal in the thus set road-to-vehicle transmission period.

Each vehicle 12 is driven by an engine and installs an in-vehicle terminal apparatus. The in-vehicle terminal apparatus generates a frame based on the control information contained in the received packet signal. As a result, frames generated respectively by a plurality of in-vehicle terminal apparatuses are synchronized with a frame generated by the base station apparatus 10. The in-vehicle terminal apparatus carries out CSMA/CA and thereby broadcasts the packet signals in the inter-vehicular transmission periods. The in-vehicle terminal apparatus stores information, such as the information regarding the present location of the in-vehicle terminal apparatus, in the packet signal. The in-vehicle terminal apparatus also stores the control information in the packet signal. In other words, the control information transmitted from the base station apparatus 10 is transferred by the in-vehicle terminal apparatus.

At the same time, in-vehicle terminal apparatuses that cannot receive the packet signals sent from the base station apparatus 10, namely those located in the almost-unreachable area 214, carry out CSMA/CA to broadcast their packet signals regardless of the frame construction. Further, the in-vehicle terminal apparatus receives packet signals sent from other terminal apparatuses and thereby conveys the approach of vehicles in which the other terminal apparatuses are installed to the driver. The short-range radio communication between the in-vehicle terminal apparatus and the mobile apparatus will be discussed later.

The pedestrian 16 carries his/her own mobile terminal apparatus. The mobile terminal apparatus performs the processing similar to that of the in-vehicle terminal apparatus. In order to simplify the processing, however, the mobile terminal apparatus does not notify the pedestrian of the approach of vehicle(s). Further, the mobile terminal apparatus is not equipped with a function to obtain the position information by GPS or the like. The mobile terminal apparatus broadcasts a packet signal that contains an ID with which to identify the mobile terminal apparatus (hereinafter referred to as "mobile terminal apparatus ID").

The in-vehicle terminal apparatus measures the receiving strength of the packet signal received from the mobile terminal apparatus and thereby estimates if the pedestrian 16 carrying the mobile terminal apparatus is present near the vehicle 12.

Figure 2:
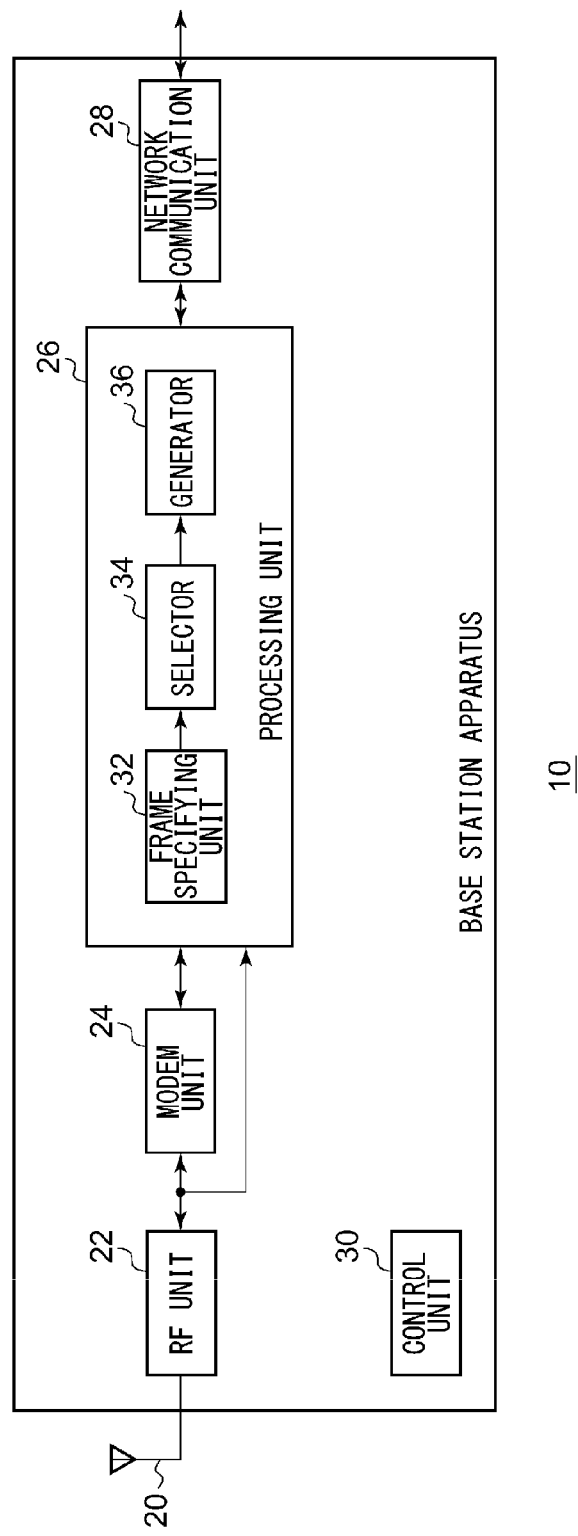
FIG. 2 shows a base station apparatus shown in FIG. 1.

FIG. 2 shows the base station apparatus 10. The base station apparatus 10 includes an antenna 20, an RF unit 22, a modem unit 24, a processing unit 26, a network communication unit 28, and a control unit 30. The processing unit 26 includes a frame specifying unit 32, a selector 34, and a generator 36.

As a receiving processing, the RF unit 22 receives, through the antenna 20, packet signals transmitted from not-shown terminal apparatuses and the other base station apparatuses (not shown). The RF unit 22 performs a frequency conversion on the received packet signal of a radiofrequency and thereby generates a packet signal of baseband. Further, the RF unit 22 outputs the baseband packet signal to the modem unit 24. Generally, a baseband packet signal is formed of an in-phase component and a quadrature component, and therefore the baseband packet signal is to be represented by two signal lines. However, the baseband packet signal is represented by a single signal line here to make the illustration clearer for understanding. The RF unit 22 also includes an LNA (Low Noise Amplifier), a mixer, an AGC (Automatic Gain control) unit, and an A/D (Analog-to-Digital) converter.

As a transmission processing, the RF unit 22 performs a frequency conversion on the baseband packet signal inputted from the modem unit 24 and thereby generates a radiofrequency packet signal. Further, the RF unit 22 transmits, through the antenna 20, the radiofrequency packet signal in a road-to-vehicle transmission period. The RF unit 22 also includes a PA (Power Amplifier), a mixer, and a D-A (Digital-to-Analog) converter.

As a receiving processing, the modem unit 24 demodulates the baseband packet signal fed from the RF unit 22. Further, the modem unit 24 outputs the demodulation result to the processing unit 26. As a transmission processing, the modem unit 24 modulates the data fed from the processing unit 26. Further, the modem unit 24 outputs the modulation result to the RF unit 22 as a baseband packet signal. It is to be noted here that the communication system 100 is compatible with an OFDM (Orthogonal Frequency Division Multiplexing) modulation scheme and therefore the modem unit 24 performs FFT (Fast Fourier Transform) as a receiving processing and performs IFFT (Inverse Fast Fourier Transform) as a transmission processing as well.

The frame specifying unit 32 receives signals sent from the not-shown GPS satellites and acquires information on the time of day based on the received signals. Note that known art can be used for the acquisition of information on the time of day and therefore the description thereof is omitted here. The frame specifying unit 32 generates a plurality of frames based on the information on the time of day. For example, the frame specifying unit 32 generates ten "100 msec" frames by dividing a duration of "1 sec" into 10 parts with reference to the timing indicated by the information on the time of day. Frames are thus defined and specified repeatedly through the repetition of this process.

Note that the frame specifying unit 32 may detect the control information from the demodulation result and generate frames based on the detected control information. Such a processing as this corresponds to a process of generating a frame synchronized with the timing of the frames formed by the other base station apparatuses 10. FIGS. 3A to 3D each shows a format of frame specified in the communication system 100. FIG. 3A shows a structure of a frame. Each frame is constructed of N subframes denoted by a first subframe to an N-th subframe. For example, when each frame is 100 msec long and N is 8, the subframe of 12.5 msec in length (duration) is defined. A description of FIGS. 3B to 3D will be given later. Now, refer back to FIG. 2.

The selector 34 selects a subframe, with which to set the road-to-vehicle transmission period, from among a plurality of subframes contained in a frame. More to the point, the selector 34 receives a frame defined by the frame specifying unit 32. The selector 34 receives the input of demodulation results from the not-shown other base station apparatuses 10 or other terminal apparatuses via the RF unit 22 and the modem unit 24. The selector 34 extracts the demodulation result sent from the other base station apparatuses 10 from among the demodulation results inputted. The selector 34 identifies a subframe, which does not receive the demodulation result, by identifying the subframe that has received the demodulation result. This corresponds to identifying an unused subframe, namely, a subframe to which the road-to-vehicle transmission period is not set by the other base station apparatuses 10. If there are a plurality of unused subframes, the selector 34 will randomly select a single subframe. If there is no unused subframes, namely, if a plurality of subframes are all used respectively, the selector 34 will acquire the received power corresponding to the demodulation result and select preferentially a subframe whose received power is small.

FIG. 3B shows a structure of a frame generated by a first base station apparatus 10a. The first base station apparatus 10a sets a road-to-vehicle transmission period at the beginning of the first subframe. Subsequent to this road-to-vehicle transmission period, the first base station apparatus 10a sets an inter-vehicular transmission period in the first subframe. The inter-vehicular transmission period is a period during which a terminal apparatus can broadcast a packet signal. In other words, the subframes are defined such that the first base station apparatus 10a can broadcast the packet signal in the road-to-vehicle transmission period assigned to the beginning of the first subframe and such that an in-vehicle terminal apparatus can broadcast the packet signal in the inter-vehicular transmission period, which is a period other than the road-to-vehicle transmission period, in each frame. Further, the first base station apparatus 10a sets the inter-vehicular transmission periods only to the second to N-th subframes from the second subframe.

FIG. 3C shows a structure of a frame generated by a second base station apparatus 10b. The second base station apparatus 10b sets a road-to-vehicle transmission period at the beginning of the second subframe. Also, the second base station apparatus 10b sets an inter-vehicular transmission period to the subsequent remaining period of the second subframe, and sets the inter-vehicular transmission periods to the first subframe, the third to N-th subframes. FIG. 3D shows a structure of a frame generated by a third base station apparatus 10c. The third base station apparatus 10c sets a road-to-vehicle transmission period at the beginning of the third subframe. Also, the third base station apparatus 10c sets an inter-vehicular transmission period to the subsequent remaining period of the third subframe, and sets the inter-vehicular transmission periods to the first and second subframes and the fourth to N-th subframes. In this manner, a plurality of base station apparatuses 10 select mutually different subframes from each other and then set the road-to-vehicle transmission periods at their beginnings of the mutually different subframes selected, respectively. Now refer back to FIG. 2. The selector 34 outputs the selected subframe number to the generator 36.

Figure 4A:
FIGS. 4A and 4B each shows a structure of subframe shown in FIGS. 3A to 3D.
Figure 4B:

The generator 36 sets the road-to-vehicle transmission periods to the subframes that correspond to the received subframe numbers, and generates RSU (roadside unit) packet signals to be broadcast in the road-to-vehicle transmission periods. In the following description, no distinction will be made between the terms "RSU packet signal" and "packet signal". FIGS. 4A and 4B each shows a structure of subframe. FIG. 4A shows a subframe in which a road-to-vehicle transmission period is set. As shown in FIG. 4A, each subframe is constituted of a road-to-vehicle transmission period and an inter-vehicular transmission period in this order. FIG. 4B shows an arrangement of packet signal in the road-to-vehicle transmission period. As shown in FIG. 4B, a plurality of RSU packet signals are arranged in the road-to-vehicle transmission period. It should be noted here that the previous and next packet signals are separated by a short interframe space (SIFS).

A description is given here of a structure of RSU packet signal. FIGS. 5A and 5B each shows a format of MAC (Message Authentication Code) frame stored in a packet signal defined in the communication system 100. FIG. 5A shows a format of MAC frame. The MAC frame is constructed such that "MAC header", "LLC (Logical Link Control) header", "message header", "data payload", and "FCS (Frame Check Sequence)" are assigned in this order starting from the beginning. FIG. 5B is a diagram showing a structure of message header generated by the generator 36. The message header includes a basic part.

The basic part includes "protocol version", "transmission node type", "the number of reuses", "TSF (Timing Synchronization Function) timer", and "RSU transmission period length". The protocol version indicates a version of compatible protocol. The transmission node type indicates a sender of packet signal that contains the MAC frame. For example, "0" indicates a terminal apparatus, and "1" indicates the base station apparatus 10. To distinguish between the in-vehicle terminal apparatus and the mobile terminal apparatus, the transmission node type is indicated by 2 bits. When the selector 34 extracts the demodulation results sent from the other base station apparatuses 10 from the inputted demodulation results, the selector 34 utilizes the value of the transmission node type. The number of reuses indicates an index of validity in the case when the header message is transferred by the terminal apparatus. TSF timer indicates the transmission time. The RSU transmission period length indicates the time length of road-to-vehicle transmission period and therefore the RSU transmission period is said to serve as the information regarding the road-to-vehicle transmission period. Now refer back to FIG. 2.

The generator 36 generates information on a vehicle 12, which is present near the intersection where the base station apparatus 10 is installed, based on the position information contained in the packet signals received from the terminal apparatuses. Hereinafter, such information as this generated by the generator 36 will be referred to as "obstacle detection information". In order to generate the obstacle detection information, an area that surrounds the intersection may be defined. This area may be the area 212. The generator 36 generates obstacle detection information based on the information on a vehicle 12 whose position information indicates that it is located within a given area, among the packet signals received within a predetermined period of time. Also, the generator 36 generates information on a pedestrian 16, who is present near the intersection where the base station apparatus 10 is installed, based on the position information contained in the packet signals received from the terminal apparatuses.

Hereinafter, such information as this will be referred to as "pedestrian detection information".

It is to be noted here that the pedestrian detection information may be regarded as the obstacle detection information without being distinguished from the obstacle detection information. The generator 36 stores the obstacle detection information in the data payload. The network communication unit 28 connects to a not-shown network 202. The network communication unit 28 receives traffic congestion information and traffic light color information from the network 202. The traffic light color information is information that indicates the schedule regarding when the color in use of a traffic light installed at the intersection is to change. The generator 36 acquires the traffic congestion information and the traffic light color information from the network communication unit 28, and generates the aforementioned RSU packet signals by storing the traffic congestion information and the traffic light color information in the data payload. The control unit 30 controls the entire processing of the base station apparatus 10.

These structural components may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 6:
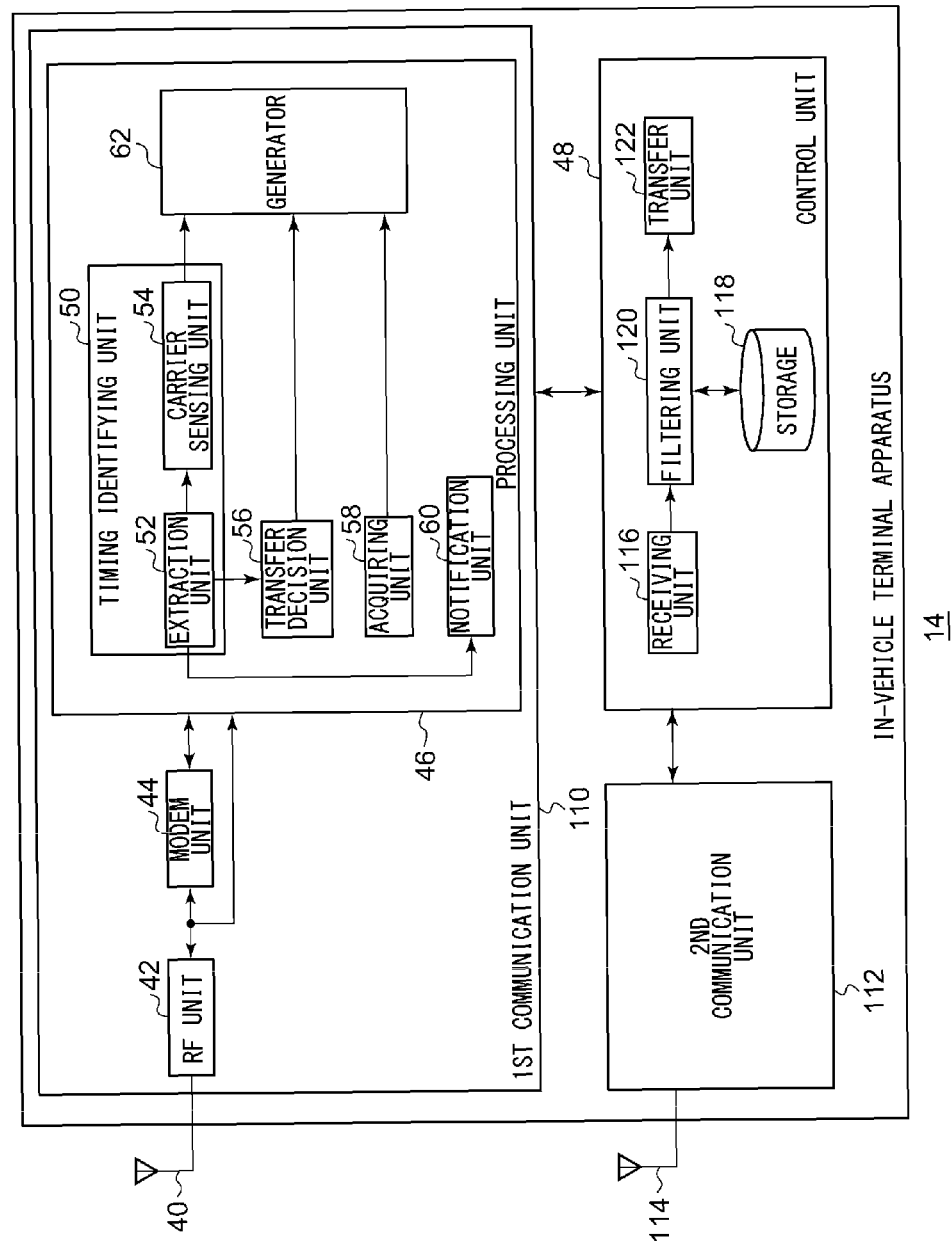
FIG. 6 shows a structure of an in-vehicle terminal apparatus mounted on each vehicle shown FIG. 1.

FIG. 6 shows a structure of an in-vehicle terminal apparatus 14 mounted on a vehicle 12. The in-vehicle terminal apparatus 14 includes a first communication unit 110, a second communication unit 112, and a control unit 48. The first communication unit 110 includes a first antenna 40, an RF unit 42, a modem unit 44, and a processing unit 46. The processing unit 46 includes a timing identifying unit 50, a transfer decision unit 56, an acquiring unit 58, a notification unit 60, and a generator 62. The timing identifying unit 50 includes an extraction unit 52 and a carrier sensing unit 54. The second communication unit 112 includes a second antenna 114. The control unit 48 includes a receiving unit 116, a storage 118, a filtering unit 120, and a transfer unit 122. The first antenna 40, the RF unit 42, and the modem unit 44 perform the processings similar to those of the antenna 20, the RF unit 22, and the modem unit 24 of FIG. 2, respectively. A description is therefore given here centering around features different from those of FIG. 2.

The modem unit 44 and the processing unit 46 in the first communication unit 110 receive the packet signals sent from the not-shown other terminal apparatuses and the base station apparatus 10, according to the ITS communication scheme as explained in conjunction with FIG. 2. As described earlier, the modem unit 44 and the processing unit 46 receive the packet signals, sent from the base station apparatus 10, in the road-to-vehicle transmission period. As described earlier, the modem unit 44 and the processing unit 46 receive the packet signals, sent from the other in-vehicle terminal apparatuses 14 and not-shown mobile terminal apparatuses, in the inter-vehicular transmission period.

If the demodulation result fed from the modem unit 44 relates to the packet signal sent from the not-shown base station apparatus 10, the extraction unit 52 will identify the timing of a subframe assigned to the road-to-vehicle transmission period. In this case, it is estimated that the extraction unit 52 of the in-vehicle terminal apparatus 14 is located within the area 212. The extraction unit 52 generates frames based on the timing of the subframe and the content of message header in the packet signal (more specifically, the content of RSU transmission period length). Since the frames may be generated similarly to the aforementioned frame specifying unit 32, the description thereof is omitted here. As a result, the extraction unit 52 generates a frame synchronized with the frame formed by the base station apparatus 10.

If, on the other hand, no RSU packet signals is being received, it will be estimated that the in-vehicle terminal apparatus 14 is currently located in the almost-unreachable area 214. If it is estimated that the in-vehicle terminal apparatus 14 is located in the area 212, the extraction unit 52 will select an inter-vehicular transmission period. If it is estimated that the in-vehicle terminal apparatus 14 is located in the almost-unreachable area 214, the extraction unit 52 will select the timing unrelated to the frame construction. If the inter-vehicular transmission period is selected, the extraction unit 52 will output the timings of frame and subframes and the information on the inter-vehicular transmission period to the carrier sensing unit 54. As the extraction unit 52 selects the timing unrelated to the frame construction, the extraction unit 52 instructs the carrier sensing unit 54 to carry out carrier sensing.

The carrier sensing unit 54 receives, from the extraction unit 52, the timing of frame and subframes and the information on the inter-vehicular transmission period. The carrier sensing unit 54 measures an interference power by performing carrier sensing in the inter-vehicular transmission period. Also, the carrier sensing unit 54 determines the transmission timing in the inter-vehicular transmission period, based on the interference power measured. More specifically, the carrier sensing unit 54 stores beforehand a predetermined threshold value and compares the interference power against the threshold value. If the interference power is smaller than the threshold value, the carrier sensing unit 54 will determine the transmission timing. If the execution of carrier sensing is instructed from the extraction unit 52, the carrier sensing unit 54 will execute CSMA without regard to the frame construction and thereby determine the transmission timing. The carrier sensing unit 54 conveys the thus determined transmission timing to the generator 62.

The acquiring unit 58 includes a GPS receiver, a gyro sensor, a vehicle speed sensor, and so forth all of which are not shown. The acquiring unit 58 acquires the present position, traveling direction, traveling speed and so forth of an in-vehicle terminal apparatus 14, based on data supplied from the aforementioned not-shown components of the acquiring unit 58. Hereinafter the present position, traveling direction, traveling speed and so forth thereof will be generically referred to as "positional information" or "position information". The present position thereof is indicated by the latitude and longitude. Known art may be employed to acquire them and therefore the description thereof is omitted here. The acquiring unit 58 outputs the positional information to the generator 62.

The transfer decision unit 56 controls the transfer of the message headers. The transfer decision unit 56 extracts the message headers from the packet signal. If the packet signal is directly sent from the base station apparatus 10, the number of reuses is set to "0". If the packet signal is sent from the other in-vehicle terminal apparatuses 14, the number of reuses will be set to "1 or greater". The transfer decision unit 56 selects a message header to be transferred, from the extracted message headers. For example, a message header whose number of reuses is the minimum is selected. Also, the transfer decision unit 56 may generate a new message header by combining the contents contained in a plurality of message headers. The transfer decision unit 56 outputs the message header to be selected, to the generator 62. In so doing, the transfer decision unit 56 increases the number of reuses by "1".

The generator 62 receives the positional information from the acquiring unit 58 and receives the message header sent from the transfer decision unit 56. The generator 62 uses the MAC frame shown in FIGS. 5A and 5B and stores the positional data in the data payload. The generator 62 generates a packet signal containing the MAC frame and transmits, by broadcast, the thus generated packet signal with the transmission timing determined by the carrier sensing unit 54, via the modem unit 44, the RF unit 42, and the first antenna 40. This corresponds to the inter-vehicular communication. Note that the transmission timing is included in the inter-vehicular transmission period.

The notification unit 60 acquires the packet signal sent from the not-shown base station apparatus 10 via the extraction unit 52 and also acquires the packet signals sent from the not-shown other in-vehicle terminal apparatuses 14. As a process carried out for the acquired packet signal, the notification unit 60 conveys the approach or the like of the not-shown other vehicles 12 and pedestrians 16 to the driver via a monitor and/or speaker according to the content of the data stored in the packet signal. Further, the notification unit 60 conveys the obstacle detection information, the traffic congestion information, the traffic light color information and so forth to the driver via the monitor and/or speaker. The processing unit 46 measures the receiving strength of the packet signals received by the first communication unit 110. It should be noted that known art can be used for the measurement of the receiving strength and therefore the description thereof is omitted here.

The second communication unit 112 communicates with the not-shown mobile apparatus through the second antenna 114. A short-range radio communication scheme, which differs from the ITS communication scheme used in the first communication unit 110, is used in the communication with the mobile apparatus. An example of the short-range radio communication scheme is a scheme compliant with the IEEE 802.11.15.1 standard. This scheme handles a communication over a distance of about several meters to about several tens of meters. The scheme used for the short-range radio communication is not limited to one compliant with IEEE 802.15.1 standard, and any other schemes may also be used. Known art may be employed to realize the short-range communication scheme and therefore the description thereof is omitted here.

The control unit 48 controls the communication processing at the second communication unit 112. The receiving unit 116 receives a filtering condition from the mobile apparatus by way of the second communication unit 112. More specifically, the second communication unit 112 receives a packet signal, sent from the mobile apparatus, which stores the filtering condition. The second communication unit 112 extracts the filtering condition from the received packet signal and then outputs the extracted filtering condition to the receiving unit 116. Though a detailed description will be given later of the filtering condition, the filtering condition may be said to be a selection criterion regarding a packet signal to be transferred, among the packet signals received by the first communication unit 110, from the second communication unit 112 to the mobile apparatus.

As the filtering condition received at the receiving unit 116 is received from the receiving unit 116, the filtering unit 120 has the filtering condition stored in the storage 118. The filtering unit 120 performs filtering on the packet signals, received by the first communication unit 110, according to the filtering condition stored in the storage 118. That is, the filtering unit 120 selects a packet signal, which matches the filtering condition, from among the packet signals received by the first communication unit 110. The filtering unit 120 outputs the selected packet signal to the transfer unit 122.

The transfer unit 122 receives the packet signal, selected by the filtering unit 120, from the filtering unit 120. The transfer unit 122 extracts information contained in the packet signal received thereby. The transfer unit 122 generates a packet signal in which the extracted information is stored, and has the thus generated packet signal transferred to the mobile apparatus from the second communication unit 112. If the receiving unit 116 has received a plurality of kinds of filtering conditions, the storage 118 will store the plurality of kinds of filtering conditions and the filtering unit 120 will perform filterings, corresponding respectively to the plurality of kinds of filtering conditions, in parallel with each other.

Figure 7:
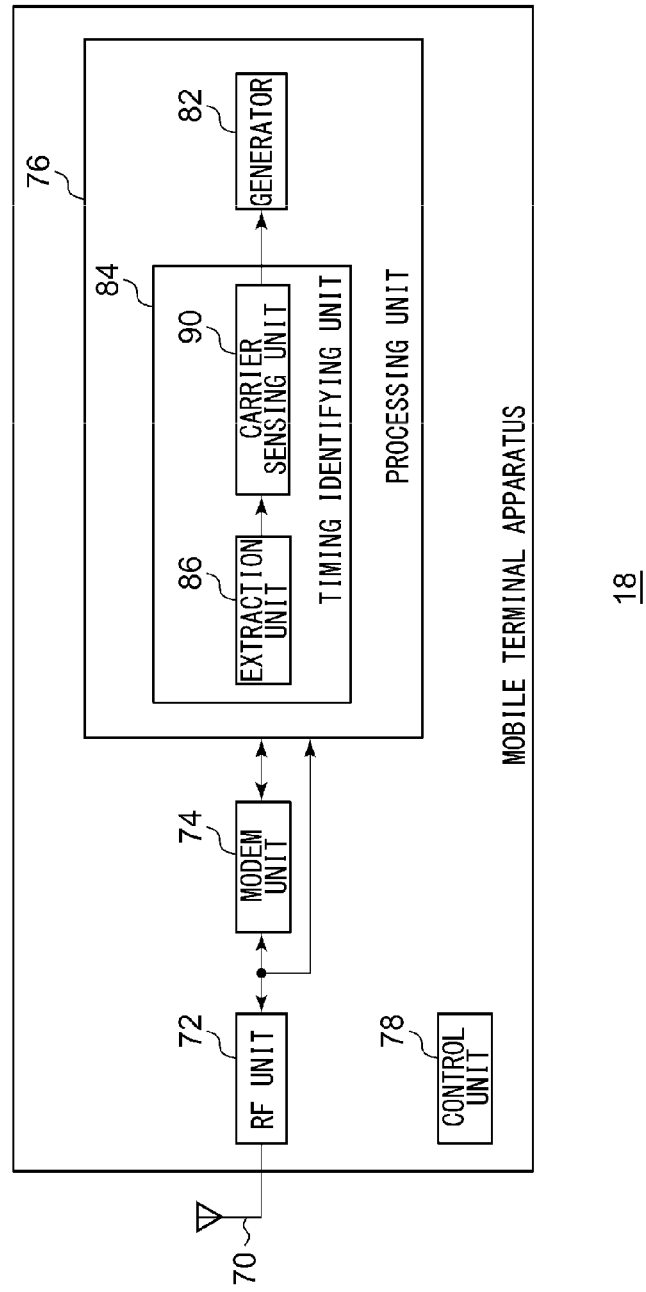
FIG. 7 shows a structure of a mobile terminal apparatus carried by each pedestrian shown FIG. 1.

FIG. 7 shows a structure of a mobile terminal apparatus 18 carried by a pedestrian 16. The mobile terminal apparatus 18 includes an antenna 70, an RF unit 72, a modem unit 74, a processing unit 76, and a control unit 78. The processing unit 76 includes a generator 82 and a timing identifying unit 84. The timing identifying unit 84 includes an extraction unit 86 and a carrier sensing unit 90.

Similar to the modem unit 44 and the processing unit 46 of FIG. 6, the modem unit 74 and the processing unit 76 receive the packet signals sent from the not-shown other terminal apparatuses and the base station apparatus 10. In particular, the modem unit 74 and the processing unit 76 receive a packet signal, containing information regarding the frame construction, which is transmitted from the base station apparatus 10 in the road-to-vehicle transmission period. Also, the modem unit 74 and the processing unit 76 receive a packet signal that is sent from an in-vehicle terminal apparatus 14 in the inter-vehicular transmission period. Here, the packet signal received thereby contains the positional information on said in-vehicle terminal apparatus 14.

If, similar to the extraction unit 52, the demodulation result from the modem unit 74 relates to the packet signal sent from the not-shown base station apparatus 10, the extraction unit 86 will identify the timing of a subframe assigned to the road-to-vehicle transmission period. Similar to the carrier sensing unit 54, the carrier sensing unit 90 carries out carrier sensing. The modem unit 74 and the RF unit 72 broadcast packet signals based on the results of carrier sensing carried out by the carrier sensing unit 90. Here, the packet signal generated by the generator 82 does not contain the positional information but contains a mobile terminal apparatus ID.

Figure 8:
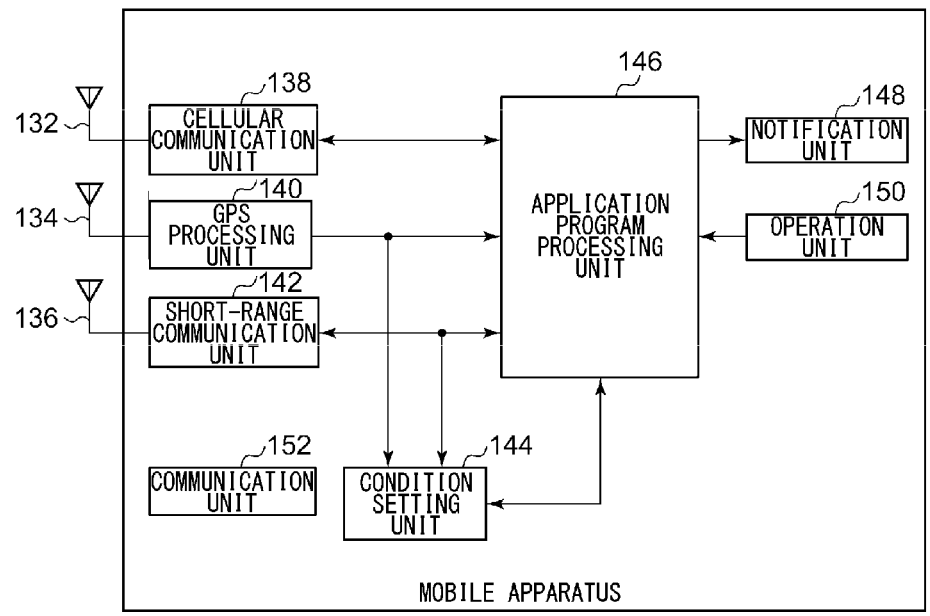
FIG. 8 shows a structure of a mobile apparatus carried by a person who gets on a vehicle shown in FIG. 1.

FIG. 8 shows a structure of a mobile apparatus 130 carried by a person who gets on the vehicle 12. The mobile apparatus 130 includes a first antenna 132, a second antenna 134, a third antenna 136, a cellular communication unit 138, a GPS processing unit 140, a short-range communication unit 142, a condition setting unit 144, an application program processing unit 146, a notification unit 148, and an operation unit 150.

The cellular communication unit 138 performs cellular communication with a not-shown base station apparatus for use in cellular communication via the first antenna 132. A communication scheme compliant with 3GPP (Third Generation Partnership Project) and 3GPP2, for instance, may be used as the cellular communication. Other communication schemes may also be used, and any known art may also be used. Voice communications may be done using the cellular communication but the description thereof is omitted here.

The GPS processing unit 140 receives signals sent from not-shown GPS satellites via the second antenna 134. The GPS processing unit 140 carries out the processing similar to that carried out by the acquiring unit 58 and acquires the positional information on the mobile apparatus 130. The short-range communication unit 142 communicates with the not-shown in-vehicle terminal apparatus 14 via the third antenna 136. The short-range radio communication scheme is used for the communications. Accordingly, the short-range communication unit 142 carries out the processing similar to that carried out by the second communication unit 112. As a result, the short-range communication unit 142 acquires, from the in-vehicle terminal apparatus 14, the information contained in the packet signals in the road-to-vehicle communication and the information contained in the packet signals in the inter-vehicular communication.

The application program processing unit 146 receives not only the information sent from the second communication unit 112 but also the positional information fed from the GPS processing unit 140. The application program processing unit 146 executes application programs based on these items of information. Though any arbitrary program may be used as the application programs, it is assumed herein, for the clarity of explanation, that application programs related to the operation of a vehicle 12 are used. Assume also that the installation and updating of such application programs are done via the cellular communication unit 138.

As an example, ten kinds of application programs are explained. Note that the application programs are not limited to these ten programs listed below. Also, at least two of those application programs may be combined into one program.

(1) Right-Turn Direct Collision Prevention Support

This program is an application program that determines the risk of collision with another vehicle 12 based on the obstacle detection information and then alerts a driver accordingly, when a driver's own vehicle 12 makes a right turn at an intersection. In this application program, not only the information on the other vehicle 12 contained in the obstacle detection information, such as the position of the other vehicle 12, is acquired but also the positional information regarding the present location of the other vehicle 12 is acquired from the GPS processing unit 140. If the other vehicle 12 is present in a right-turn direction, the application program processing unit 146 will covey the risk of accidents to the driver through the notification unit 148. The notification unit 148 is comprised of a monitor and a speaker.

(2) Right/Left-Turn Pedestrian Collision Prevention Support

This program is an application program that determines the risk of collision with a vehicle 12 based on the pedestrian detection information and then alerts a driver and/or a pedestrian 16 accordingly, when a driver's own vehicle 12 makes a right or left turn at an intersection. In this application program, not only the information on a pedestrian 16 contained in the pedestrian detection information, such as the position of the pedestrian 16, is acquired but also the positional information regarding the present location of the pedestrian 16 is acquired from the GPS processing unit 140. If the pedestrian is present in a right or left-turn direction, the application program processing unit 146 will covey the risk of accidents to the driver and/or the pedestrian 16 through the notification unit 148.

(3) Start Delay Prevention Support

This program is an application program that conveys a start preparation to the driver while the vehicle 12 stops at an intersection, before the traffic light color changes to a color (e.g., green) at which the vehicle 12 can start. In this application program, the fact that the vehicle 12 stops at the intersection is determined based on the present positional information acquired from the GPS processing unit 140 and the map data stored in the application program processing unit 146. The traffic light color information indicates how many seconds later the traffic light color will change, for instance.

The application program acquires a duration of time in which the signal light changes from a red light to a green light, based on the traffic light color information. The application program processing unit 146 conveys the start preparation to the driver, based on the acquired time duration, a few seconds before the signal light changes to the green light. If the vehicle 12 does not start after a while even after the signal light has changed to the green light, a warning may be given to the driver.

(4) Turn-Off-Engine-when-Stopped Support

This program is an application program that prompts the driver to turn off the engine while the vehicle 12 stops at an intersection, if a duration of time, in which the traffic light color changes to a color (e.g., green) at which the vehicle 12 can start, is long. In this application program, too, the fact that the vehicle 12 stops at the intersection is determined based on the present positional information acquired from the GPS processing unit 140 and the map data stored in the application program processing unit 146. The application program acquires the duration of time in which the signal light changes from a red light to a green light, based on the traffic light color information. If the acquired time duration is longer than a predetermined time length, the application program processing unit 146 will convey an instruction of turning off the engine while stopped, to the driver through the notification unit 148.

(5) Green Wave Running Support

This program is an application program that conveys to the driver a vehicle speed at which the vehicle can pass through the next intersection, where the vehicle 12 is scheduled to come across next, with a green light (namely, without having to stop at the incoming intersection), based on the distance between the current intersection at which the vehicle is currently running and said next intersection. The application program processing unit 146 executes a routing assistance or route guide as with a navigation system. In this application program, the traffic light color information on traffic signals installed along with a route is acquired and then a traveling speed, at which the vehicle 12 can pass through a plurality of intersections with the green lights, is computed. Known art may be employed to compute the traveling speed and therefore description thereof is omitted here. The application program processing unit 146 conveys the traveling speed to the driver through the notification unit 148.

(6) Collision (Rear-End Collision) Prevention Support

This program is an application program that predicts the risk of collisions with another vehicle 12 based on the positional information, altitude information, vehicle speed and traveling direction of the vehicle 12. In this application program, the current positional information is acquired from the GPS processing unit 140. This application program not only estimates a course or route to be taken from now on, based on a change in the positional information but also acquires the positional information sent from an in-vehicle terminal apparatus 14 mounted on the other vehicle 12. If an area of a predetermined size is defined in the direction of the course and if the other vehicle 12 is located within this area, the application program processing unit 146 will convey the risk of accidents to the driver through the notification unit 148.

(7) CLP Congestion Prediction

This program is an application program that predicts congestion in a targeted direction, based on the vehicle speed and traveling direction as to the information with which to identify a road (hereinafter referred to as "road ID"). This application program executes the processing similar to the collision (rear-end collision) prevention support. However, the distance between the current positional information and the area is loner than that in the collision (rear-end collision) prevention support. In other words, the CLP congestion support takes an area, which the vehicle 12 will come across and pass through in the future, more into consideration than the collision (rear-end collision) prevention support does.

(8) Communications

This program is an application program that sends messages to a nearby vehicle 12 and a vehicle having specific vehicle attributes. The messages may be a request for a traffic lane change by a vehicle 12, for instance. This application program executes the processing similar to the collision (rear-end collision) prevention support and acquires information sent from an in-vehicle terminal apparatus 14 to which a specific ID has been assigned. If the application program processing unit 146 can obtain the information, the application program processing unit 146 will convey to the driver, through the notification unit 148, that the specific vehicle 12 is located near the driver's vehicle.

(9) Accident-at-Start-Timing Prevention Support

This program is an application program that conveys to the driver that a pedestrian 16 is located near a vehicle 12 when the vehicle 12 is started. This application program determines that the vehicle 12 is at a stop, based on the current positional information acquired from the GPS processing unit 140. If the receiving strength of packet signal, which is sent from the mobile terminal apparatus 18 and is then received by the in-vehicle terminal apparatus 14, is larger than a threshold value, the application program will estimate that the pedestrian 16 is present near the vehicle 12. If the pedestrian 16 is present, the application program processing unit 146 will convey a risk of accidents to the driver through the notification unit 148.

(10) Displaying of a Pedestrian Carrying One of a Matched Pair of Terminal Apparatuses This is an application program that determines if a pedestrian 16 carrying a mobile terminal apparatus 18 is located near the vehicle 12. Here, a certain mobile terminal apparatus 18 is assigned to an in-vehicle terminal apparatus 14 beforehand (i.e., this mobile terminal apparatus 18 and the in-vehicle terminal apparatus 14 are a matched pair of terminal apparatuses). More specifically, this application program determines to see if there is such a pedestrian 16 carrying said mobile terminal apparatus 18 that is pre-assigned to the in-vehicle terminal. If the in-vehicle terminal apparatus 14 has received packet signals sent from said mobile terminal apparatus 18 corresponding to one of the matched pair thereof, this application program will acquire the receiving strength from the in-vehicle terminal apparatus 14. Also, the application program estimates the position where the pedestrian 16, carrying said mobile terminal apparatus corresponding to one of the matched pair thereof, is present, based on the receiving strength. The application program processing unit 146 conveys the estimated position to the driver through the notification unit 148.

As described above, the information to be transferred from the in-vehicle terminal apparatus 14 differs depending on an application program used. The condition setting unit 144 sets a filtering condition suitable for an application program that has been started, and generates a packet signal in which the filtering condition is stored. Further, the condition setting unit 144 has the short-range communication unit 142 transmit the packet signal. The condition setting unit 144 stores in advance a filtering condition for each application program. The condition setting unit 144 selects a filtering condition in accordance with an application program started by the application program processing unit 146. If a plurality of application programs are started, the condition setting unit 144 selects a plurality of filtering conditions corresponding respectively to the plurality of running application programs.

FIG. 9 is a diagram showing a data structure of a table in the condition setting unit 144. As shown in FIG. 9, the table contains an application program name column 220, a startup timing column 222, a filtering condition column 224, and a sender-of-broadcast-packet-signals column 226. The application program name column 220 indicates the above-described ten kinds of application programs. The startup timing column 222 indicates timing with which each application program is started. The right-turn direct collision prevention support is started when a packet signal, which contains information indicating that a turn signal indicates a right turn, is acquired via the short-range communication unit 142, in addition to the case when the positional information acquired by the GPS processing unit 140 indicates that the vehicle 12 has approached to an intersection, indicated by the map data stored in the application program processing unit 146, which is located away from the vehicle 12 by a certain distance. To achieve this right-turn direct collision prevention support, the turn signal is connected to the in-vehicle terminal apparatus 14, and the directional information outputted from the turn signal is transferred from the turn signal to the in-vehicle terminal apparatus 14.

The right/left-turn pedestrian collision prevention support is started when a packet signal, which contains information indicating that a turn signal indicates a right turn, is acquired via the short-range communication unit 142, in addition to the timing when the right-turn direct collision prevention support is started. The start delay prevention support is started when the positional information acquired from the GPS processing unit 140 indicates that the vehicle 12 is at a stop, in addition to the case when the positional information acquired by the GPS processing unit 140 indicates that the vehicle 12 has approached to an intersection, indicated by the map data stored in the application program processing unit 146, which is located away from the vehicle 12 by a certain distance. The other application programs are each started when an entry through the operation unit 150 is received.

The filtering condition column 224 indicates filtering conditions, and the sender-of-broadcast-packet-signals column 226 indicates senders of original packet signals that are to be transferred. In the right-turn direct collision prevention support, for example, a road-to-vehicle communication packet signal broadcast from the base station apparatus 10 is to be transferred. A base station apparatus ID indicates an identification number of a base station apparatus 10 that the vehicle 12 is approaching. In the green wave running support, the base station ID is not specified but a transfer interval is set in such a manner as to be a larger value, as the filtering condition. This corresponds to transferring the road-to-vehicle communication packet signals by thinning them out.

In the collision (rear-end collision) prevention support and the CLP congestion prediction, area information is set as a filtering condition, and inter-vehicular packet signals broadcast from other in-vehicle terminal apparatuses 14 are to be transferred. When the area information is set, the positional information acquired from the GPS processing unit 140 is used. In the communications, the ID of an in-vehicle terminal apparatus 14 may be set as a filtering condition, in addition to the filtering conditions set in the collision (rear-end collision) prevention support and the CLP congestion prediction. The positions of areas set in the collision (rear-end collision) prevention support, the CLP congestion prediction and the communications, respectively, may differ from each other. In the accident-at-start-timing prevention support, a threshold value for the receiving strength is set as a filtering condition, and packet signals broadcast from the mobile terminal apparatus 18 are to be transferred. As a result, the filtering unit 120 of the in-vehicle terminal apparatus 14 selects a packet signal having a receiving strength greater than the threshold value and then transfers the thus selected packet signal. In the displaying of a pedestrian carrying one of a matched pair of terminal apparatuses, the ID of a mobile terminal apparatus 18 in the matched pair is set as a filtering condition.

Figure 10:
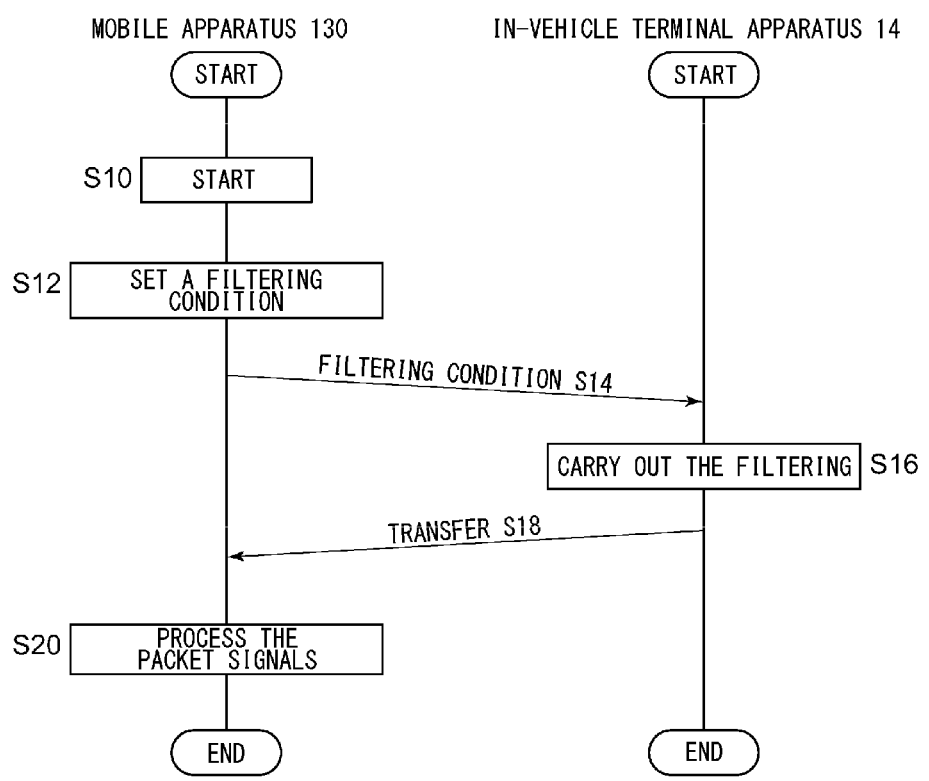
FIG. 10 is a sequence diagram showing a transfer processing carried out by the in-vehicle terminal apparatus of FIG. 6 and the mobile apparatus of FIG. 7.

An operation of the communication system 100 configured as above is now described. FIG. 10 is a sequence diagram showing a transfer processing carried out by the in-vehicle terminal apparatus 14 and the mobile apparatus 130. An application program is activated by the application program processing unit 146 of the mobile apparatus 130 (S10). The condition setting unit 144 sets a filtering condition (S12). The mobile apparatus 130 transmits the filtering condition to the in-vehicle terminal apparatus 14 (S14). The filtering unit 120 of the in-vehicle terminal apparatus 14 performs filtering according to the filtering condition (S16). The transfer unit 122 transfers a packet signal selected by the filtering to the mobile apparatus 130 (S18). The application program processing unit 146 of the mobile apparatus 130 processes the packet signal, which has been transferred from the in-vehicle terminal apparatus 14 (S20).

A modification of the examples is now described. The present modification relates to an in-vehicle terminal apparatus. The in-vehicle terminal apparatus according to the examples filters the packet signals so as to obtain a packet signal to be transferred to the terminal apparatus. On the other hand, the in-vehicle terminal apparatus according to the modification filters the received packet signals for the purpose of reducing the amount of packet signals subjected to the receiving processing in the communication units. This is because the processing amount of the receiving processing needs to be reduced in the in-vehicle terminal apparatus. The communication system 100, the base station apparatus 10 and the mobile terminal apparatus 18 according to the modification are similar to those of FIG. 1, FIG. 2 and FIG. 7, respectively.

Figure 11:
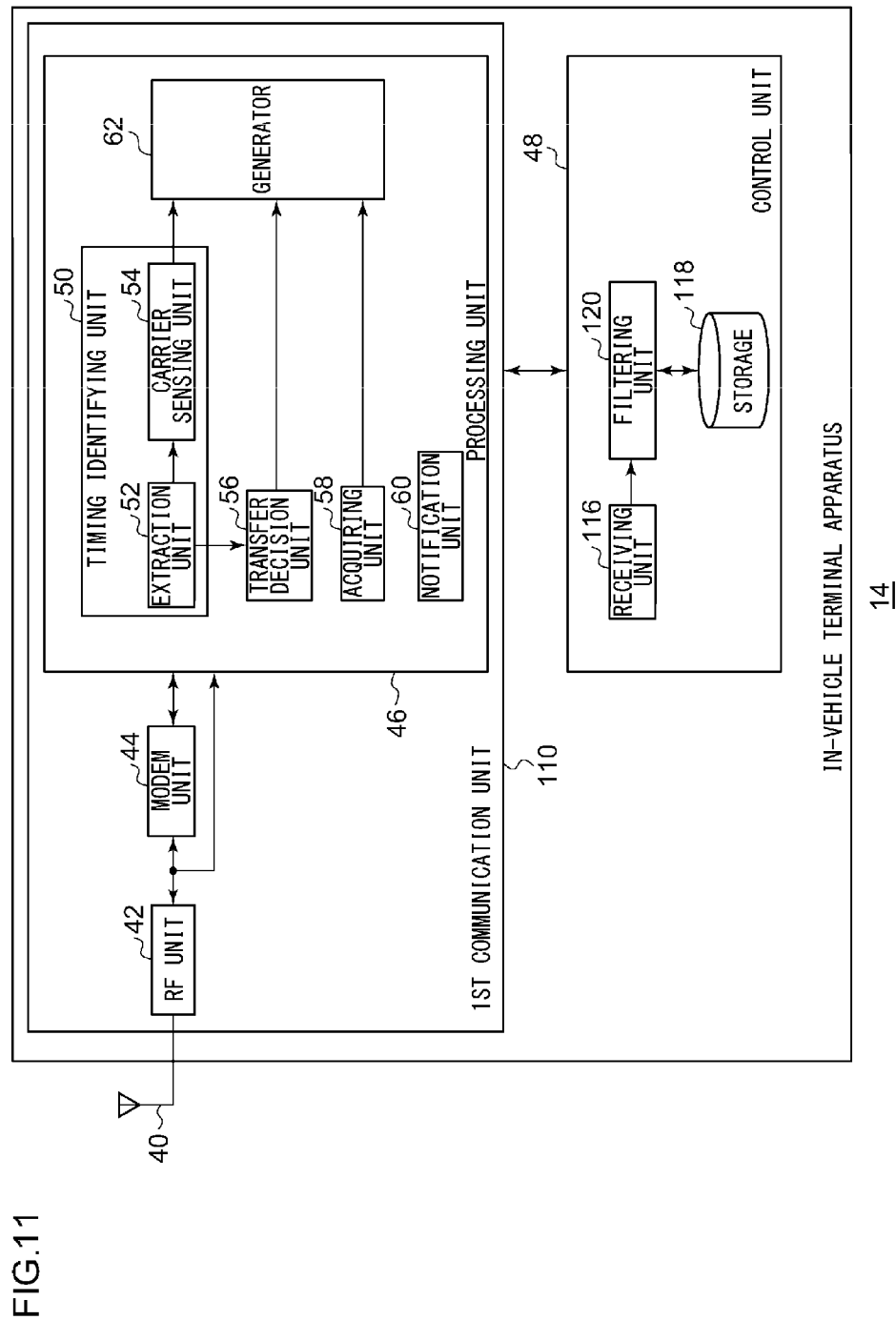
FIG. 11 shows a structure of an in-vehicle terminal apparatus according to a modification of an example.

FIG. 11 shows a structure of an in-vehicle terminal apparatus 14 mounted on a vehicle 12. The in-vehicle terminal apparatus 14 includes a first communication unit 110 and a control unit 48. The first communication unit 110 includes a first antenna 40, an RF unit 42, a modem unit 44, and a processing unit 46. The processing unit 46 includes a timing identifying unit 50, a transfer decision unit 56, an acquiring unit 58, a notification unit 60, and a generator 62. The timing identifying unit 50 includes an extraction unit 52 and a carrier sensing unit 54. The control unit 48 includes a receiving unit 116, a storage 118, and a filtering unit 120. Components in FIG. 11 indicated by the same reference numerals as those of the components included in FIG. 6 carry out the same processings as those described in conjunction of FIG. 6. A description is given here centering around features different from those of FIG. 6.

The filtering unit 120 selects a packet signal, received by the receiving unit 116, which matches the filtering condition, from among the received packet signals. The filtering unit 120 outputs the selected packet signal to the notification unit 60. The notification unit 60 processes the packet signal received from the filtering unit 120.

According to the examples of the present disclosure, the packet signal to be transferred is selected based on the filtering condition received from the mobile apparatus, so that information needed by the mobile apparatus can be transferred. Also, since the packet signal to be transferred is selected based on the filtering condition received from the mobile apparatus, the increase in traffic volumes for the transfer can be suppressed. Also, since unnecessary packet signals are not transferred, the traffic volumes to be processed by the mobile apparatus can be suppressed. Also, since the traffic volumes to be processed by the mobile apparatus are suppressed, the processing amount in the mobile apparatus can be suppressed. Also, since the filtering condition is set depending on an application program, information suitable for the application program run in the mobile apparatus can be transferred. Also, the threshold value for the receiving strength is set as a filtering condition and then a packet signal whose receiving strength is greater than the threshold value is selected. Thus, packet signals having shorter transmission distances can be selected. Also, since packet signals having shorter transmission distances are selected, the position can be estimated even though the positional information is not included in the packet signals. Also, since the filtering is performed on the received packet signals, the processing amount of the receiving processing in the in-vehicle terminal apparatus can be reduced.

The present disclosure has been described based on the examples and their modification. The examples are intended to be illustrative only, and it is understood by those skilled in the art that further various modifications to constituting elements and processes as well as arbitrary combinations thereof could be further developed and that such modifications and combinations are also within the scope of the present disclosure.

In the examples of the present disclosure, the mobile apparatus 130 and the in-vehicle terminal apparatus 14 exist in the same vehicle 12. The in-vehicle terminal apparatus 14 is mounted on the vehicle 12, and the mobile apparatus 130 is carried by a passenger in the vehicle 12. This should not be considered as limiting and, for example, the mobile apparatus 130 and the in-vehicle terminal apparatus 14 may be physically connected to each other such that the mobile apparatus 130 is equipped with a cradle used to connect the mobile apparatus 130 and such that the mobile apparatus 130 is plugged into the cradle. In such a case, a short-range radio communication scheme may be used for communications between the mobile apparatus 130 and the in-vehicle terminal apparatus 14. Or alternatively a wired communication scheme may be used for communications therebetween. By employing the present modification, the mobile apparatus 130 and the in-vehicle terminal apparatus 14 can be used integrally.

An outline of one example according to the present disclosure is as follows. A terminal apparatus according to one example of the present disclosure includes: a first communication unit for receiving packet signals broadcast from a base station apparatus and for receiving packet signals broadcast from another terminal apparatus according to a first communication scheme; a second communication unit for communicating with a mobile apparatus according to a second communication scheme that differs from the first communication scheme; and a control unit for controlling communication processing carried out by the second communication unit. The control unit includes: a receiving unit for receiving a filtering condition from the mobile apparatus by way of the second communication unit; a filtering unit for selecting a packet signal, which matches the filtering condition received by the receiving unit, from among the packet signals received by the first communication unit; and a transfer unit for transferring information, contained in the packet signal selected by the filtering unit, from the second communication unit to the mobile apparatus.

By employing this example, the packet signal to be transferred is selected based on the filtering condition received from the mobile apparatus, so that the increase in traffic volumes for the transfer can be suppressed.

The terminal apparatus may further include a measuring unit for measuring the receiving strength of the packet signals received by the first communication unit. The filtering condition received by the receiving unit may be a threshold value for the receiving strength thereof, and the filtering unit may select a packet signal whose receiving strength is larger than the threshold value. Since, in this case, packet signals having the receiving strength greater than the threshold value are selected, the packet signals having shorter transmission distances can be selected.

Another example of the present disclosure relates to a communication system. The communication system includes: a base station apparatus for broadcasting packet signals according to a first communication scheme; a plurality of terminal apparatuses for broadcasting packet signals according to the first communication scheme; and a mobile apparatus for communicating with the terminal apparatuses according to a second communication scheme that differs from the first communication scheme. Each of the plurality of terminal apparatuses includes: a first communication unit for receiving the packet signals broadcast from the base station apparatus and for receiving packet signals broadcast from another terminal apparatus; a second communication unit for communicating with the mobile apparatus; and a control unit for controlling communication processing carried out by the second communication unit. The control unit includes: a receiving unit for receiving a filtering condition from the mobile apparatus by way of the second communication unit; a filtering unit for selecting a packet signal, which matches the filtering condition received by the receiving unit, from among the packet signals received by the first communication unit; and a transfer unit for transferring information, contained in the packet signal selected by the filtering unit, from the second communication unit to the mobile apparatus.

Still another example of the present disclosure relates to a terminal apparatus. The terminal apparatus includes: a communication unit for receiving packet signals broadcast from a base station apparatus in a first period and for receiving packet signals broadcast from another terminal apparatus in a second period, in a frame where the first period and the second period are time-division multiplexed, wherein the first period is used to transmit packet signals from the base station apparatus, and the second period is used to transmit packet signals between terminal apparatuses; a receiving unit for receiving a filtering condition; and a filtering unit for selecting a packet signal, which matches the filtering condition received by the receiving unit, from among the packet signals received by the communication unit.

By employing this example, the filtering is performed on the received packet signals, so that the processing amount of the receiving processing in the in-vehicle terminal apparatus can be reduced.

What is claimed is:

1. A terminal apparatus comprising:
  a first communication unit configured to receive packet signals broadcast from a base station apparatus and configured to receive packet signals broadcast from another terminal apparatus according to a first communication scheme;
  a second communication unit configured to communicate with a mobile apparatus according to a second communication scheme that differs from the first communication scheme; and
  a control unit configured to control communication processing carried out by the second communication unit,
  the control unit including:
    a receiving unit configured to receive a filtering condition from the mobile apparatus by way of the second communication unit, the filtering condition being area information regarding a predefined area ahead of a vehicle on which the terminal is mounted;
    a filtering unit configured to select a packet signal, which matches the filtering condition received by the receiving unit, from among the packet signals received by the first communication unit; and
    a transfer unit configured to transfer information, contained in the packet signal selected by the filtering unit, from the second communication unit to the mobile apparatus.

2. A communication system comprising:
  a base station apparatus configured to broadcast packet signals according to a first communication scheme;
  a plurality of terminal apparatuses configured to broadcast packet signals according to the first communication scheme; and
  a mobile apparatus configured to communicate with the terminal apparatuses according to a second communication scheme that differs from the first communication scheme,
  each of the plurality of terminal apparatuses including:
  a first communication unit configured to receive the packet signals broadcast from the base station apparatus and configured to receive packet signals broadcast from another terminal apparatus;
  a second communication unit configured to communicate with the mobile apparatus; and
  a control unit configured to control communication processing carried out by the second communication unit,
  the control unit including:
    a receiving unit configured to receive a filtering condition from the mobile apparatus by way of the second communication unit, the filtering condition being area information regarding a predefined area ahead of a vehicle on which the terminal is mounted;
    a filtering unit configured to select a packet signal, which matches the filtering condition received by the receiving unit, from among the packet signals received by the first communication unit; and
    a transfer unit configured to transfer information, contained in the packet signal selected by the filtering unit, from the second communication unit to the mobile apparatus.

3. A terminal apparatus comprising:
  a communication unit configured to receive packet signals broadcast from a base station apparatus in a first period and configured to receive packet signals broadcast from another terminal apparatus in a second period, in a frame where the first period and the second period are time-division multiplexed,
  wherein the first period is used to transmit packet signals from the base station apparatus, and the second period is used to transmit packet signals between terminal apparatuses;
  a receiving unit configured to receive a filtering condition, the filtering condition being area information regarding a predefined area ahead of a vehicle on which the terminal is mounted; and a filtering unit configured to select a packet signal, which matches the filtering condition received by the receiving unit, from among the packet signals received by the communication unit.

* * * * *